Dec. 22, 1953  A. FRIED ET AL  2,663,203
DEBURRING, CHAMFERING, AND COUNTERSINKING TOOL
Filed Feb. 12, 1952  2 Sheets-Sheet 1
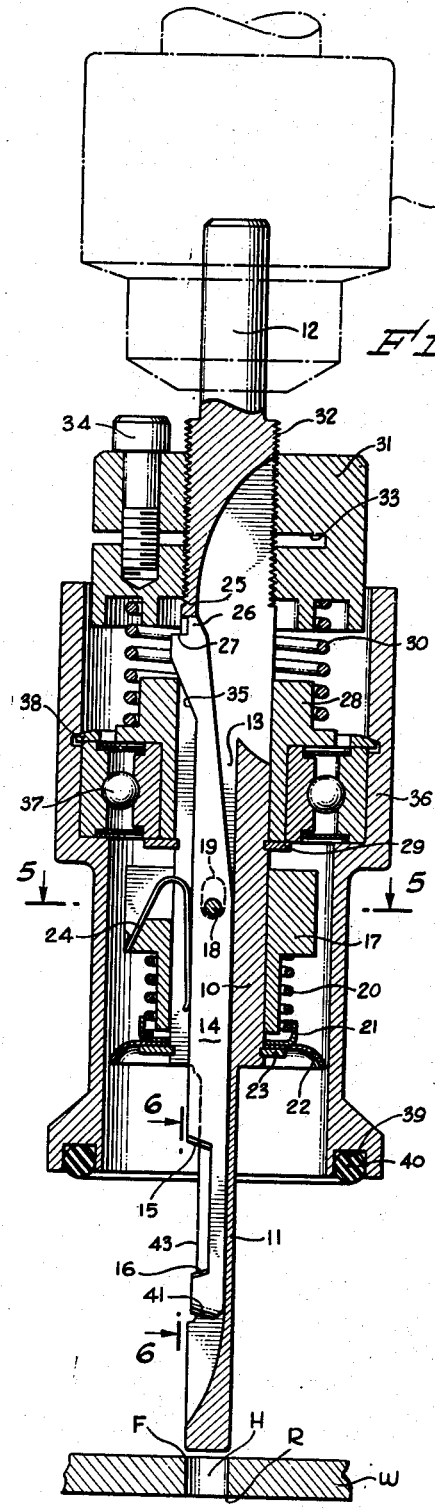
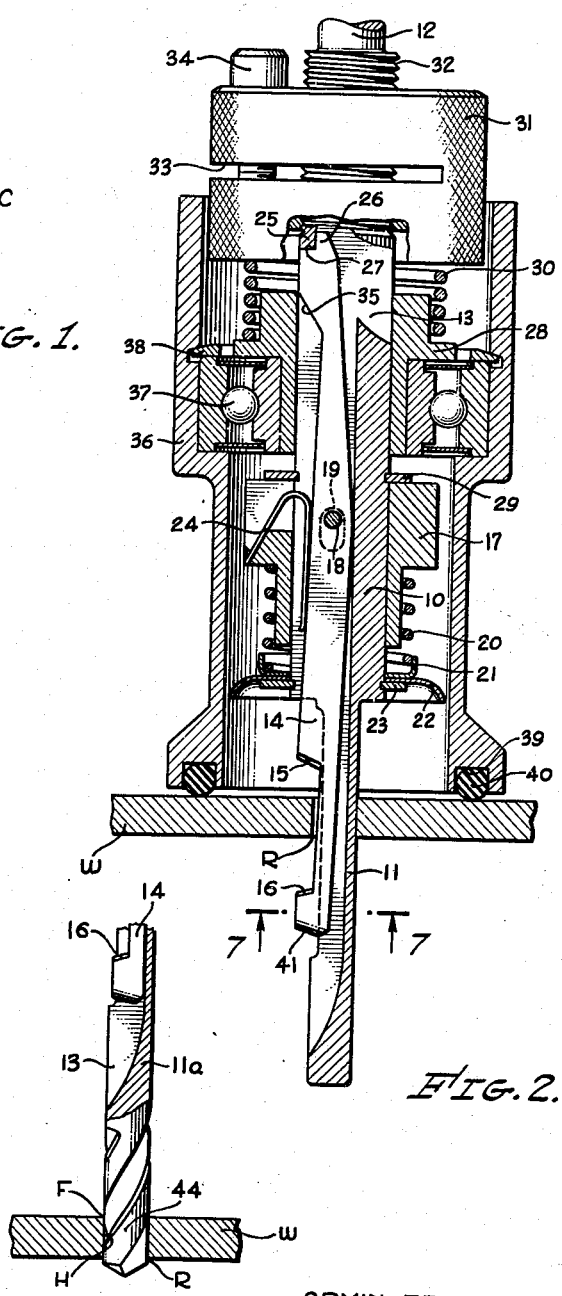
ARMIN FRIED
JOSEPH W. FRIED
INVENTOR.
BY *Hazard & Miller*
ATTORNEYS Dec. 22, 1953　　　A. FRIED ET AL　　　2,663,203
DEBURRING, CHAMFERING, AND COUNTERSINKING TOOL
Filed Feb. 12, 1952　　　　　　　　　　　　2 Sheets-Sheet 2
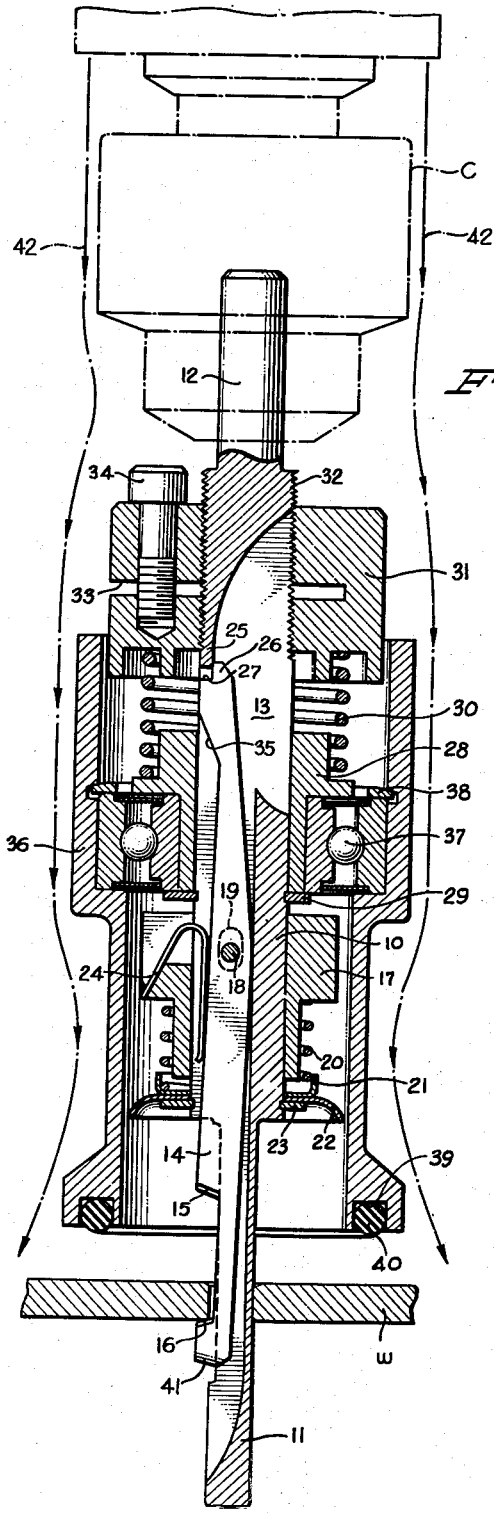
FIG. 4.
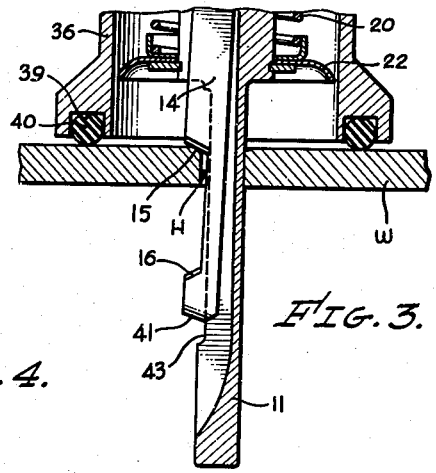
FIG. 3.
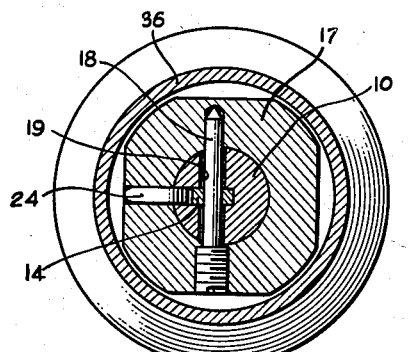
FIG. 5.
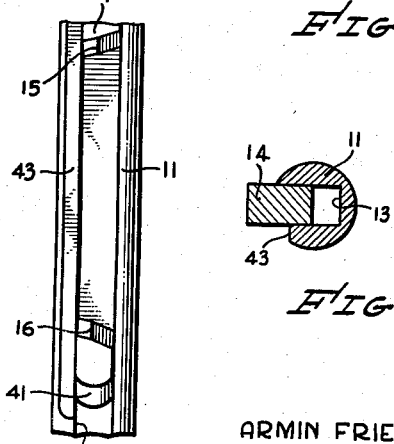
FIG. 6.
FIG. 7.
ARMIN FRIED
JOSEPH W. FRIED
INVENTOR.
BY Hazard & Miller
ATTORNEYS Patented Dec. 22, 1953

2,663,203

UNITED STATES PATENT OFFICE 2,663,203

DEBURRING, CHAMFERING, AND COUNTERSINKING TOOL

Armin Fried and Joseph W. Fried, Burbank, Calif.

Application February 12, 1952, Serial No. 271,142

9 Claims. (Cl. 77—73.5)

This invention relates to a tool for performing deburring, chamfering and countersinking operations.

A primary object of the invention is to provide a tool applicable to the chuck of an air drill, electric drill or similar piece of equipment which will rapidly and easily remove burrs at both the forward and rear ends of a hole in a work piece. The tool may be used merely for removing burrs formed or created in the course of drilling the hole in the work piece but by deepening the cut made with the tool it may be used to perform a chamfering operation or even countersinking.

Among the more common situations wherein the tool embodying the present invention may be advantageously employed is that on aircraft where skin structures usually formed of aluminum sheet metal are riveted to stiffeners, ribs and the like. In such structures the relatively soft sheet metal is of such a character that when it is drilled through a burr is formed on the forward or obverse side of the sheet and at the rear or reverse side of the sheet. In order that a rivet placed in such a hole may be tight it is necessary that the burrs be completely removed from both faces. While the deburring of the forward or obverse side may be accomplished by many existing tools, the removal of the burrs on the reverse side frequently presents a considerable problem due to its inaccessibility. Even where such rear faces of the sheet may be accessible a second operation is usually required to remove the burrs from that surface.

A primary object of the present invention is to provide an improved tool consisting essentially of a pilot shaft adapted to be axially rotated and within which there is disposed a projectible blade. This blade has formed thereon two spaced cutting edges one of which is directed forwardly to remove the burrs or to chamfer around the forward end of the hole and the other of which is directed rearwardly so that it may remove the burrs or chamfer around the rear end of the hole. The blade and pilot are so designed that the rearwardly directed cutting edge may be housed completely within the general contour of the pilot during insertion of the pilot into the hole. Thereafter the blade may be shifted into projected position wherein the rearwardly directed cutting edge is projected laterally beyond the pilot and is effective to remove the burrs around the rear end of the hole. The improved tool is so designed that the depth of cut made by the forwardly directed cutting edge can be regulated or adjusted with respect to the forward surface and while no stop is provided limiting the depth of cut made by the rearwardly directed cutting edge, provision is made to cause this cutting edge to be automatically retracted into the pilot when longitudinal pressure of sufficient magnitude is applied thereto. In this manner the rearwardly directed cutting edge may first be effective to remove the burrs at the rear end of the hole in the course of withdrawing the pilot and then be automatically shifted into its retracted position enabling the pilot to be withdrawn from the hole without continued cutting action. In this manner, by means of the improved tool the pilot may be merely inserted into the hole and withdrawn therefrom and a burr-removing cut or a chamfering or a countersinking cut may optionally be obtained at both ends of the hole.

With the foregoing and other objects in view, which will be made manifest in the following detailed description and specifically pointed out in the appended claims, reference is had to the accompanying drawings for an illustrative embodiment of the invention, wherein:

Figure 1 is a sectional view illustrating the improved tool in that position assumed by the parts prior to its introduction into the hole that is to be deburred or chamfered;

Fig. 2 is a similar view but illustrating the pilot as having been introduced into the hole and the blade shifted into projected position. The position illustrated is just prior to performing a deburring operation at the forward end of the hole;

Fig. 3 is a partial view in vertical section illustrating the deburring operation as being accomplished at the forward end of the hole;

Fig. 4 is a view similar to Fig. 1 but illustrating the pilot of the tool as being in the process of being withdrawn from the hole and the deburring operation being accomplished at the rear end of the hole;

Fig. 5 is a sectional view taken substantially upon the line 5—5 upon Fig. 1;

Fig. 6 is a partial view in elevation taken substantially upon the line 6—6 upon Fig. 1;

Fig. 7 is a sectional view taken upon the line 7—7 upon Fig. 2; and

Fig. 8 is a partial view illustrating an alternative form of construction.

Referring to the accompanying drawings wherein similar reference characters designate similar parts throughout, W indicates a work piece which may be of metal, plastic or other material in which a hole H is formed. Such a hole may be formed by drilling in which case, if the material of the work piece is soft, burrs are apt to be formed at the forward end F and at the rear end R of the hole. On the other hand, it is possible that the hole H may be otherwise formed in the work piece and it is desired to chamfer the edges F and R or to countersink at the ends of the hole.

The improved tool comprises a pilot shaft 10 one end of which is reduced in size, as indicated at 11, to form a pilot of a diameter such that it may readily enter and pass through the hole H. The other end of the pilot shaft is shaped, as indicated at 12, so as to be receivable in a chuck C driven by an air drill, electric drill, or similar piece of rotative equipment which will rotate the pilot shaft about its longitudinal axis. Within the pilot shaft there is formed a longitudinally extending groove 13 in which is disposed a blade 14. This blade has two spaced cutting edges 15 and 16. The spacing between these cutting edges is of no great importance other than that they must be greater than the thickness of the work piece W. The cutting edge 15 may be regarded as the forwardly directed cutting edge in that it is intended to deburr or chamfer the forward edge F of the hole. The cutting edge 16 may be regarded as the rearwardly directed cutting edge as it is designed to deburr or chamfer the rear end R of the hole H. That portion of the blade on which the cutting edge 16 is formed is sufficiently narrowed so that it may assume a retracted position disposed entirely within the general contour of the pilot, as shown in Fig. 1, and while the cutting edge 15 might be similarly arranged it is not necessary that this edge be capable of being completely so retracted and consequently it has not been so illustrated. A collar 17 is slidably mounted on the pilot shaft 10 and has a pivot pin 18 extending diametrically thereacross. This pivot pin extends through elongated slots 19 in the sides of the pilot shaft and through the blade 14 so that the blade may swing on the pivot pin from its fully retracted position shown in Fig. 1 into its projected position shown in Fig. 2. The collar 17 is urged longitudinally of the pilot shaft by means of a compression spring 20 one end of which is seated on the enlargement of the collar and the other end of which is seated on a spring seat 21. A dirt shield or dirt guard 22 is disposed between the spring seat 21 and a split snap ring 23 that is seated in a groove on the pilot shaft. A bowed spring 24 is mounted on the collar and bears against the blade 14 so as to be effective to constantly urge the blade 14 to swing about the pivot pin 18 into retracted position.

Within the pilot shaft 10 there is an angular shoulder 25 which is engageable by the end of a short finger 26 when the blade 14 is in retracted position, as shown in Fig. 1, and which is engageable by a shoulder 27 on the blade when the blade is in projected position as shown in Fig. 2. Consequently, although the spring 20 continually exerts pressure on the collar 17 tending to push this collar upwardly with respect to the pilot shaft, such movement is limited or prevented by the engagement of the end of the finger 26 with the shoulder 25 or the engagement of the shoulder 27 with the shoulder 25.

Above the collar 17 a sleeve 28 is slidably mounted on the pilot shaft. This sleeve has its downward movement limited by means of a snap ring 29 recessed in a groove on the pilot shaft. It is continually urged downwardly by means of a compression spring 30 that is compressed between a flange on the sleeve 28 and an adjustable stop ring 31. The stop ring 31 is threaded onto the pilot shaft 10 by means of the threads 32 and is transversely split as indicated at 33. The divided portions of the stop ring can be drawn together by means of a bolt or set screw 34 and caused to bind upon the threads 32 so as to lock the stop ring in any adjusted position along the length of the threads 32. The spring 30 is a relatively heavy spring as compared with the spring 20.

The blade 14 is equipped with a cam edge 35 that is engageable by the sleeve 28 so that if the sleeve 28 is forced upwardly relative to the pilot shaft 10 against the action of the spring 30 it will serve to cam the upper end of the blade 14 inwardly and swing the shoulder 27 in opposition to the shoulder 25. When such inward swinging of the upper end of the blade is accomplished spring 20 is effective to shift the blade upwardly by means of its pivot pin 18, the pivot pin merely sliding upwardly in the slots 19 in the pilot shaft. In this manner the blade 14 may be shifted from the position shown in Fig. 1 to the position shown in Fig. 2 by a mere upward movement of the sleeve 28 relative to the cam 35. The sleeve 28 has a skirt 36 rotatably mounted thereon by means of an anti-friction bearing 37. The outer race of this bearing is retained against the shoulder on the interior of the skirt by means of a snap ring 38. The lower end of the skirt is recessed as at 39 to accommodate a rubber bumper 40. This rubber bumper may be in the form of a rubber O-ring that is stretched into the groove 39. Its function is to prevent the bottom of the skirt from scarring or mutilating the forward face of the work piece.

The operation of the above described construction is substantially as follows: While the pilot shaft is being rotated by the chuck C with the parts in the position shown in Fig. 1, the pilot 11 may be caused to enter the hole H. Downward movement of the pilot shaft is continued until the bumper 40 engages the forward face of the work piece. Continued downward movement of the pilot shaft relative to the arrested skirt 36 causes the sleeve 28 to move upwardly relatively to the pilot shaft. This is effective on the cam edge 35 to swing the blade about its pivot pin 18 so that the upper end of the blade is moved inwardly. The spring 20 and the collar 17 are then effective to shift the blade longitudinally into the position shown in Fig. 2 wherein the shoulder 27 engages the shoulder 25 and the finger 26 is positioned behind the shoulder 25 or inwardly thereof. This serves to lock the projected cutting edge 16 from being retracted by radial forces applied thereto. Downward movement of the pilot shaft 10 is continued and as the skirt 36 and the sleeve 28 have their downward movement arrested the spring 30 is compressed. Downward movement of the pilot shaft is ultimately limited and arrested by the engagement of the stop ring 31 with the sleeve 28. In this position wherein the stop ring and sleeve mutually engage, the cutting edge 15 has just reached the forward end F of the hole H and is effective during rotation of the pilot shaft to remove the burr. If it is desired to chamfer the forward end of the hole H the stop ring 31 is adjusted upwardly relative to the pilot shaft so as to delay its engagement with the sleeve 28 until the cutting edge 15 has taken a deeper cut. Similarly if the stop ring 31 is adjusted somewhat higher on the pilot shaft the cutting edge 15 may be caused to take a countersinking cut. In this manner the tool adequately enables deburring, chamfering or countersinking the forward end of the hole H depending upon the adjustment of the stop ring 31 with respect to the pilot shaft. If the stop ring 31 is located at a relatively high position on the pilot shaft, only a deburring operation will be performed by the cutting edge 15. On the other hand, if the stop ring is adjusted relatively low with respect to the pilot shaft, the downward movement of the pilot shaft relatively to the skirt is allowed to continue until the cutting edge 15 may perform either a chamfering or countersinking operation.

Upon the completion of the operation by the cutting edge 15 the pilot 11 can be withdrawn from the hole H. During its withdrawal the cutting edge 16 will engage the rear end R of the hole H and likewise perform a deburring operation thereon. A reactionary force or pressure is exerted on the cutting edge 16 by the work piece W tending to pull the blade 14 longitudinally downward with respect to the pilot shaft. This is resisted partially by the pressure of the spring 20 and by the friction of the finger 26 on the shoulder 25. The resistance is such as to cause the cutting edge 16 to perform the deburring operation and if the withdrawal of the pilot from the hole is delayed or gentled the cutting edge 16 may be caused to chamfer or even countersink. The manner in which the cutting edge 16 is sharpened may also affect the nature of the cut made at the rear end R of the hole H. The continued reactionary pressure exerted by the work piece W on the cutting edge 16 eventually causes the blade 14 to shift downwardly with respect to the pilot shaft causing the finger 26 to clear the shoulder 25. Thus, as depicted in Fig. 4, the finger 26 is just about to clear the shoulder. When the finger does clear the shoulder the spring 24 is effective to reversely swing the blade about its pivot 18 returning it to its retracted position shown in Fig. 1 and retaining it therein. In this position the cutting edge 16 is disposed entirely within the general outline or contour of the pilot so that the pilot can be withdrawn from the hole without performing any further cutting operation.

In the usual situation where merely deburring operations are performed the insertion of the pilot into the hole, the deburring of the forward end F by the cutting edge 15, and the withdrawal of the pilot from the hole causing the cutting edge 16 to deburr the rear end R and then to be retracted into the pilot, takes place with great rapidity. Ordinarily the operation is merely to insert the pilot 11 in the hole, force the skirt against the face of the work, and force the pilot shaft downwardly as far as will be permitted by the engagement of the stop ring 31 with the sleeve 28, and then withdraw the pilot from the hole. As the pilot shaft is rotated with great speed, particularly by means of an air drill, the rotations of the cutting edge 16 will adequately deburr the rear end R before the blade is shifted longitudinally of the pilot shaft and returned to its retracted position.

The lower or forward end of the blade, indicated at 41, is preferably rounded as clearly shown in Fig. 6, so that in the event that the blade should be in its projected position prior to the insertion of the pilot 11 into the hole H, this rounded surface will merely burnish the forward end F without damaging the work piece.

When the improved tool is used in conjunction with an air drill, advantage is taken of the fact that the air drill exhausts the compressed air utilized to operate it in a downward direction along the sides of the chuck C or in a direction as depicted by the arrows 42. This downward blast of exhaust air along the sides of the tool and toward the work W causes a low pressure condition to be created within the skirt 36 as the skirt is lifted from the work piece. Consequently as the skirt is lifted a draft is created in a radial direction from about the pilot 11 so that the cuttings are effectively dispersed or blown away from around the hole H.

As indicated upon the drawing, the pilot 11 at one side of the groove adjacent the cutting edges 15 and 16 is cut away to provide a chip throat 43.

It will be appreciated by those skilled in the art that, if the blade is ground back as is occasioned by sharpening the cutting edge 15, suitable compensation therefor can be made by readjusting the stop ring 31 so that the cutting edge 15 will be caused to cut to the required depth as limited by the engagement of the stop ring 31 with the sleeve 28. Cutting back of the cutting edge 16 occasioned by grinding this edge in the course of resharpening is of no material consideration.

From the above described construction it will be appreciated that the improved tool is of relatively simple construction, having relatively few moving parts, and can be easily and economically manufactured. It greatly facilitates the deburring of both the forward and rear ends of a hole in a work piece with but a single operation, namely, the insertion and the withdrawal of the pilot 11.

In Fig. 8 an alternative form of construction is disclosed wherein the pilot 11a has its end formed and shaped to conform to a metal drill, indicated at 44. In all other respects the construction of this form of the invention is the same as that previously described. In this form of construction the drill 44 may be used to drill the hole in the work W and the blade passed therethrough and shifted into its projected or expanded position. The cutting edge 15 may be caused to deburr, chamfer or countersink as previously described and, upon withdrawal, the cutting edge 16 will be caused to deburr or countersink on the rear face of the work, as previously described. In this form of construction the drilling of the hole and the deburring on both sides of the work can be all accomplished in a single operation.

Various changes may be made in the details of the construction without departing from the spirit and scope of the invention as defined by the appended claims.

We claim:

1. A device of the class described comprising a pilot shaft adapted to be rotated about its axis and inserted into a hole to be deburred or chamfered, a blade recessed in said pilot shaft presenting a forwardly directed cutting edge spaced from a rearwardly directed cutting edge engageable with the forward and rear edges of the hole respectively, a spring and slidable collar assembly about said pilot shaft for causing the blade to assume a position in the pilot shaft wherein the rearwardly directed cutting edge is disposed wholly within the pilot shaft prior to its insertion into the hole, means for causing the blade to assume a position wherein both cutting edges project laterally from the pilot shaft so that the forwardly directed cutting edge may work on the forward end of the hole as the pilot shaft is inserted therein and the rearwardly directed cutting edge may work on the rear end of the hole as the pilot shaft is withdrawn, and means responsive to pressure applied to the rearwardly directed cutting edge for causing the blade to return to a position within the pilot shaft as the pilot shaft is withdrawn from the hole and be held in such retracted position.

2. A device of the class described comprising a pilot shaft adapted to be rotated about its axis and inserted into a hole to be deburred or chamfered, a blade recessed in said pilot shaft presenting a forwardly directed cutting edge and a rearwardly directed cutting edge engageable with the forward and rear edges of the hole respectively, means for causing the blade to assume a position in the pilot shaft wherein the rearwardly directed cutting edge is disposed wholly within the pilot shaft during its insertion into the hole, means circumscribing the pilot shaft engageable with the face of the work in which the hole is formed for causing the blade to assume a projected position wherein both cutting edges project laterally from the pilot shaft to be effective on the forward end of the hole as the pilot shaft is advanced and on the rear end of the hole as the pilot shaft is withdrawn, and finger and spring elements responsive to pressure on the rearwardly directed cutting edge for causing the blade to return to a retracted position wherein the rearwardly directed cutting edge is disposed within the pilot shaft as the pilot shaft is withdrawn.

3. A device of the class described comprising a pilot shaft adapted to be axially rotated and inserted into a hole, a groove in the pilot shaft, a blade pivotally mounted in the groove presenting a forwardly directed cutting edge and a rearwardly directed cutting edge, said blade being adapted to assume a projected position wherein both cutting edges project laterally from the pilot shaft to cut on the front and rear ends of the hole respectively or a retracted position wherein the rearwardly directed cutting edge is disposed entirely within the general contour of the pilot shaft and can be withdrawn through the hole, spring and collar means about the pilot shaft for urging the blade into normally retracted position, work-contacting means circumscribing said pilot shaft for moving the blade into projected position and retaining it therein until pressure is applied to the rearwardly directed cutting edge and then allowing it to return to retracted position to be retained therein by the spring means.

4. A device of the class described comprising a pilot shaft adapted to be axially rotated and inserted into a hole, a groove in the pilot shaft, a blade pivotally mounted in the groove presenting a forwardly directed cutting edge and a rearwardly directed cutting edge, said blade being adapted to assume a projected position wherein both cutting edges project laterally from the pilot shaft to cut on the front and rear ends of the hole respectively or a retracted position wherein the rearwardly directed cutting edge is disposed entirely within the general contour of the pilot shaft and can be withdrawn through the hole, spring means urging the blade into retracted position, means defining said hole and engageable with the face of the work in which the hole is formed for shifting the blade into projected position and retaining it therein until pressure is applied to the rearwardly directed cutting edge and then allowing it to return to retracted position and be retained therein by the spring means.

5. A device of the class described comprising a pilot shaft adapted to be axially rotated and inserted into a hole in a work piece, a blade disposed in a groove extending longitudinally of the pilot shaft presenting spaced cutting edges one of which is forwardly directed and the other of which is rearwardly directed, a collar axially movable on the pilot shaft, a pivot pin extending across the collar through slots in the pilot shaft and on which the blade is pivotally mounted for swinging movement relative to the pilot shaft into either a projected or retracted position relative to the pilot shaft, a shoulder on the pilot shaft, a finger on the blade engageable with the shoulder when the blade is shifted longitudinally of the pilot shaft to hold the blade in projected position, a cam on the blade, and a skirt on the pilot shaft having means engageable with the cam to shift the blade longitudinally relatively to the pilot shaft and position its finger behind the shoulder.

6. A device of the class described comprising a pilot shaft adapted to be axially rotated and inserted into a hole in a work piece, a blade disposed in a groove extending longitudinally of the pilot shaft presenting spaced cutting edges one of which is forwardly directed and the other of which is rearwardly directed, a collar axially movable on the pilot shaft, a pivot pin extending across the collar through slots in the pilot shaft and on which the blade is pivotally mounted for swinging movement relative to the pilot shaft into either a projected or retracted position relative to the pilot shaft, a shoulder on the pilot shaft, a finger on the blade engageable with the shoulder when the blade is shifted longitudinally of the pilot shaft to hold the blade in projected position, a cam on the blade, a skirt on the pilot shaft having means engageable with the cam to shift the blade longitudinally relatively to the pilot shaft and position its finger behind the shoulder, and spring means urging the collar longitudinally of the pilot shaft to urge the blade into that position wherein its finger is behind the shoulder.

7. A device of the class described comprising a pilot shaft adapted to be axially rotated and inserted into a hole in a work piece, a blade disposed in a groove extending longitudinally of the pilot shaft presenting spaced cutting edges one of which is forwardly directed and the other of which is rearwardly directed, a collar axially movable on the pilot shaft, a pivot pin extending across the collar through slots in the pilot shaft and on which the blade is pivotally mounted for swinging movement relative to the pilot shaft into either a projected or retracted position relative to the pilot shaft, a shoulder on the pilot shaft, a finger on the blade engageable with the shoulder when the blade is shifted longitudinally of the pilot shaft to hold the blade in projected position, a cam on the blade, a skirt on the pilot shaft having means engageable with the cam to shift the blade longitudinally relatively to the pilot shaft and position its finger behind the shoulder, and spring means of the collar urging the blade to swing about the pivot pin into retracted position.

8. A device of the class described comprising a pilot shaft adapted to be axially rotated and inserted into a hole in a work piece, a blade disposed in a groove extending longitudinally of the pilot shaft presenting spaced cutting edges one of which is forwardly directed and the other of which is rearwardly directed, a collar axially movable on the pilot shaft, a pivot pin extending across the collar through slots in the pilot shaft and on which the blade is pivotally mounted for swinging movement relative to the pilot shaft into either a projected or retracted position relative to the pilot shaft, a shoulder on the pilot shaft, a finger on the blade engageable with the shoulder when the blade is shifted longitudinally of the pilot shaft to hold the blade in projected position, a cam on the blade, and a skirt on the pilot shaft engageable with the face of the work and having means engageable with the cam to shift the blade longitudinally of the pilot shaft and position its finger behind the shoulder.

9. A device of the class described comprising a pilot shaft adapted to be axially rotated and inserted into a hole in a work piece, a blade disposed in a longitudinally extending groove therein, said blade presenting spaced cutting edges one of which is directed forwardly and the other of which is directed rearwardly, a collar slidable upon the pilot shaft, a pivot pin on the collar extending through slots in the pilot shaft and on which the blade pivots, spring means urging the collar to shift the blade longitudinally of the pilot shaft in a rearward direction, spring means on the collar urging the blade to swing about the pivot pin toward retracted position, a shoulder on the pilot shaft, a finger on the blade engageable therewith, a cam on the blade, a sleeve longitudinally movable on the pilot shaft engageable with the cam to swing the blade about its pivot pin into projected position and move the blade longitudinally of the pilot shaft to position its finger behind said shoulder, an adjustable stop on the pilot shaft engageable with said sleeve, spring means between the stop and sleeve urging the stop and sleeve to separate, and a skirt engageable with the face of the work piece and rotatably mounted upon the sleeve for shifting the sleeve toward the stop against the action of the last mentioned spring means.

ARMIN FRIED.
JOSEPH W. FRIED.

References Cited in the file of this patent

UNITED STATES PATENTS

| Number | Name | Date |
|---|---|---|
| 1,568,056 | Butz | Jan. 5, 1926 |
| 2,437,822 | Jones | Mar. 16, 1948 |